May 6, 1958 E. R. McGREGOR 2,833,336
SEATS WITH ANGULARLY ADJUSTABLE BACK
Filed Oct. 25, 1955 3 Sheets-Sheet 1

INVENTOR:
EUGENE R. McGREGOR
BY
James H. Bethell
ATTORNEY

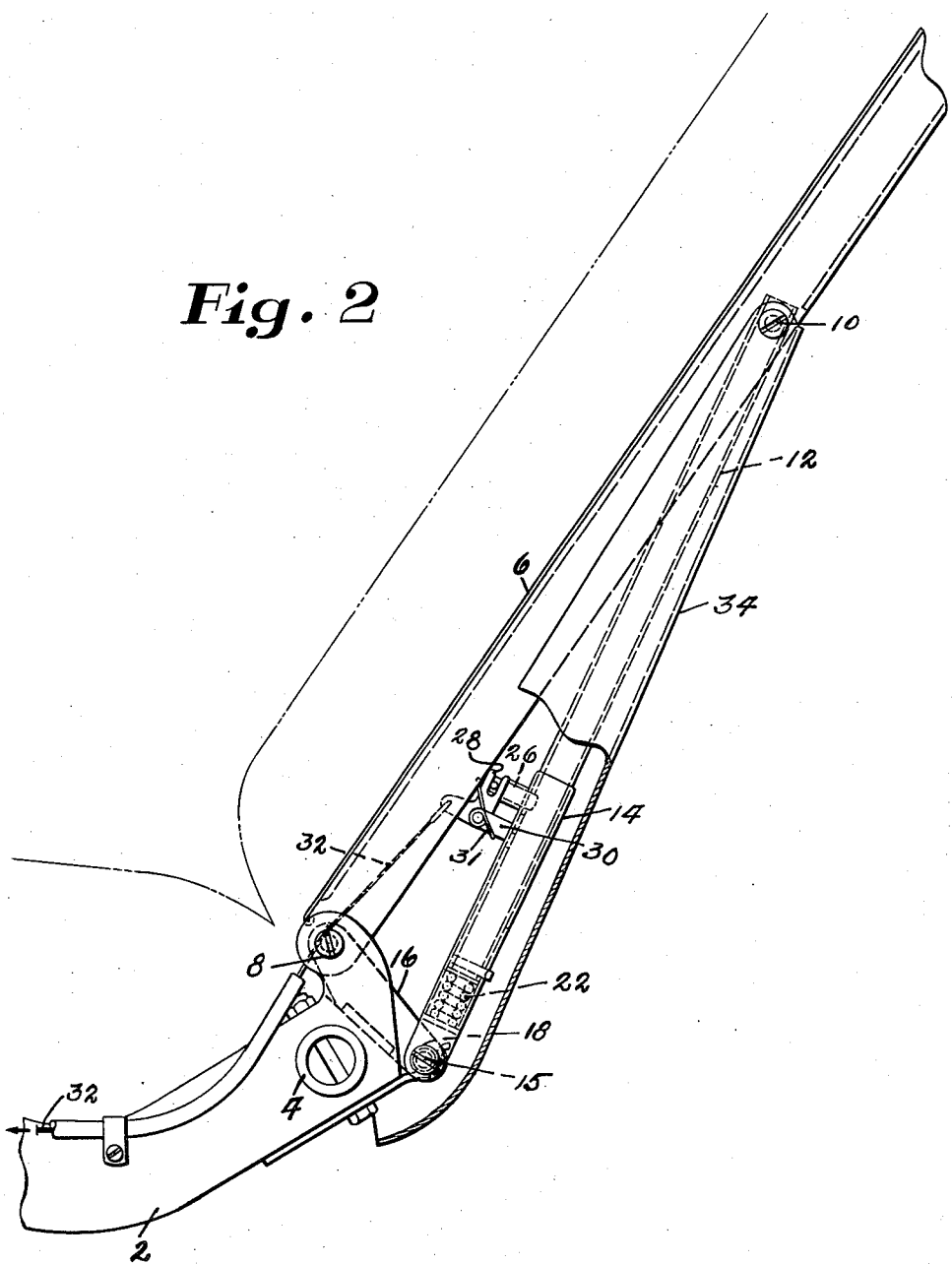

May 6, 1958 E. R. McGREGOR 2,833,336
SEATS WITH ANGULARLY ADJUSTABLE BACK
Filed Oct. 25, 1955 3 Sheets-Sheet 3
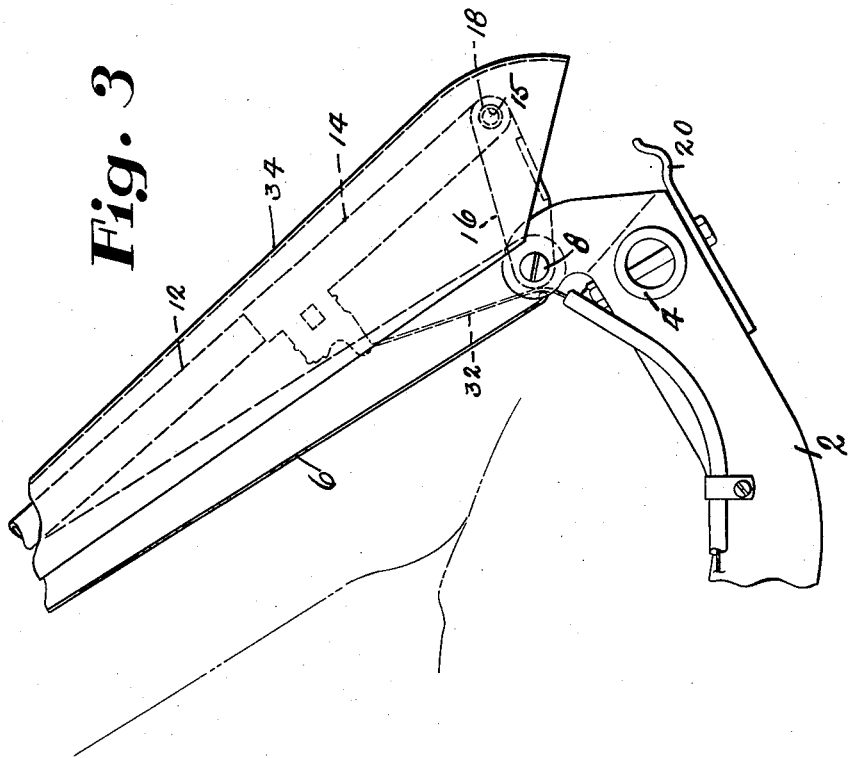
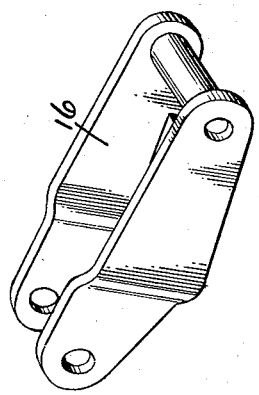
INVENTOR:
EUGENE R. McGREGOR
BY
*James G. Bethell*
ATTORNEY

United States Patent Office 2,833,336
Patented May 6, 1958

2,833,336

SEATS WITH ANGULARLY ADJUSTABLE BACK

Eugene R. McGregor, Litchfield, Conn., assignor to The Aerotherm Corporation, Bantam, Conn., a corporation of Connecticut Application October 25, 1955, Serial No. 542,704

8 Claims. (Cl. 155—160)

This invention relates to seats for aircraft and other conveyances and has for one of its objects to provide a construction which is particularly adapted for installation where space is at a premium and, hence, compactness in seat construction is very desirable.

More particularly, my improved seat is of the type in which the seat back may be tilted to various angles of recline and be locked in position. The location and mode of supporting this recline and locking mechanism constitute important novel features of my invention in that I do not require arm rests or other fixed support for mounting of this mechanism, which permits a freedom of design not heretofore obtainable.

Another advantage inherent in my improved seat construction is accessibility for installation and repair.

My improved seat also presents another advantage, namely, ease of back unit replacement, in that the seat back and the recline and locking mechanism are removable as a unit from the seat bottom.

I should like to note also that heretofore the recline mechanism for the center back of a triple seat, for example, presented an awkward situation in that the recline and locking mechanism therefor was positioned in an immovable arm rest structure or was slung under the bottom frame, reducing underseat clearance. The arrangement of the present construction eliminates both of these objections.

In addition to all of the foregoing, my invention provides a seat of the foldable type in which the back, together with the recline and locking mechanism, is readily foldable over upon the seat bottom, thereby reducing possibility of head injuries, eliminating blocking of emergency exits, and promoting handling of the entire seat assembly.

In the accompanying drawings,

Fig. 2 is a view similar to Fig. 1 with the seat back in full-recline position;

Fig. 3 shows the seat back and recline mechanism tilted or folded forward over upon the seat bottom; and Fig. 4 is an isometric view of a link constituting part of the recline mechanism and providing a connection between one end of this mechanism and the seat back itself.

Figure 1:
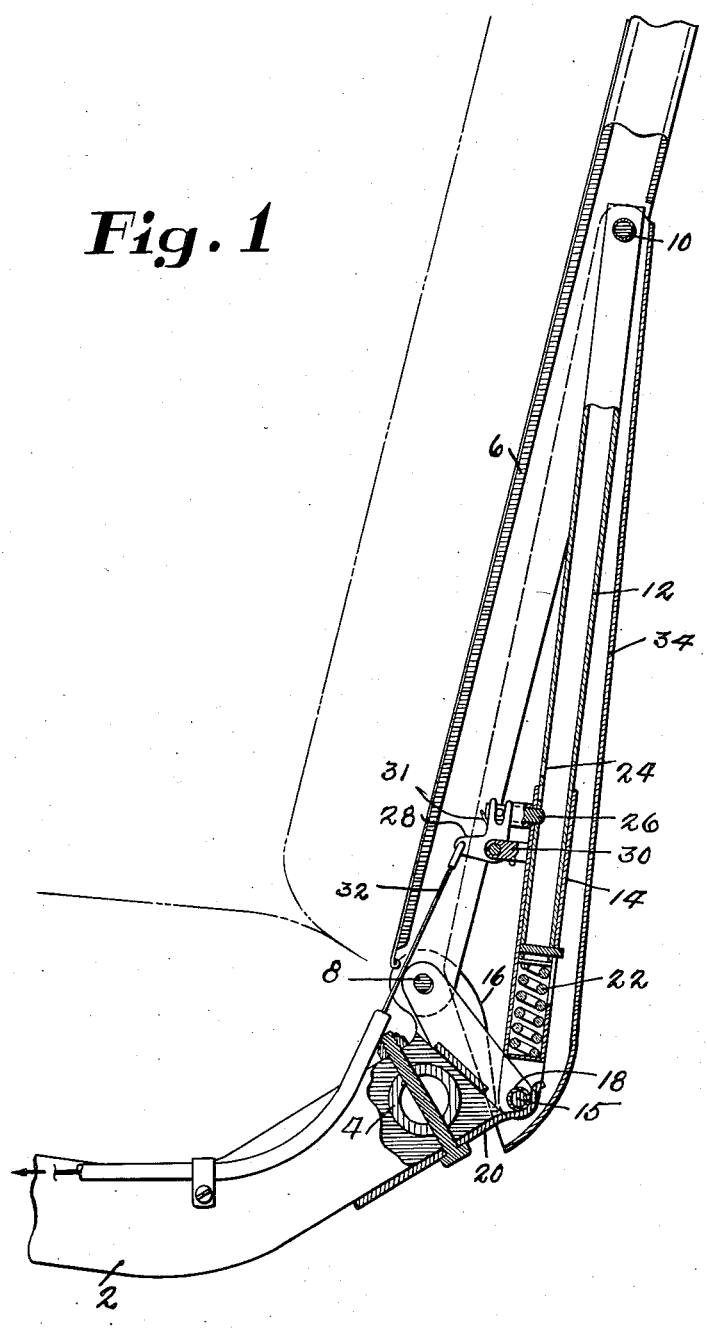
Fig. 1 is a fragmentary side elevation, in part section, of a seat embodying my invention, with the seat back in upright position.

Referring to the drawings in detail, the frame of the seat bottom comprises bottom frame fore-and-aft members 2 and rear or aft lateral or transverse bottom frame member 4. The back frame of the seat, which is designated 6, is pivoted to the bottom frame 2 by the pin or bolt 8.

Pivoted at its upper end at 10 to one side of the back frame 6 is a sleeve 12, which constitutes one element of my improved recline and locking mechanism. This sleeve is telescoped by a second sleeve 14, pivotally attached at its lower end by pin or bolt 15 to the outer end of a link 16. The two sleeves 12 and 14 together constitute an extensible link pivoted at its upper end to the back frame 6. The inner end of the second link 16 pivots on the pin 8, heretofore referred to and which, as above noted, constitutes the axis about which the back frame pivots on the bottom frame of the seat. The back frame along with the two links referred to are removable as a unit from the bottom frame.

Under normal conditions, that is to say, in all positions of the seat back 6 from upright to full recline, a hardened sleeve 18, carried by the pin or bolt 15, rests in a spring clip 20, fastened to the bottom frame 2. However, a forward force applied to the back frame 6 will disengage this sleeve 18 from the spring clip 20, permitting the entire back assembly, including the recline and locking mechanism, to topple forward upon the seat bottom, as illustrated in Fig. 3.

Within the sleeve 14 of the extensible link mechanism I provide a compression spring 22, its lower end seating on the bottom of the sleeve, while its upper end engages the lower end of the sleeve 12. The spring 22, as shown in Figs. 1 and 2, will be compressed when force in a rearward direction is applied to the seat back to recline the back, the spring returning the back to upright position upon release of this pressure, unless it be desired to lock the back in recline position.

To lock the seat back in adjusted position, the inner tube 12 of the extensible link is provided with a plurality of holes 24 through the wall thereof for cooperation with a locking pin 26, which is adapted to be projected through the wall of the outer tube 14. This pin 26 is carried by one arm of a bell crank lever 28, pivoted to a bracket 30, carried by the outer tube 14. The bell crank is provided with a torsion spring 31 to project the locking pin 26 into engagement with any of the holes 24 in the tube 12, to lock the seat back in different positions from upright to full recline. To retract the locking pin when adjusting the seat back, I provide a cable 32, which may extend forward to the front of the seat bottom and be provided with a suitable handle for easy actuation of the cable by the seat occupant.

It will be seen from the drawings and from the foregoing description that the recline and locking mechanism forms a triangle with the back frame, the back frame and the tubes 12 and 14 of the extensible link constituting the two sides of the triangle, while the link 16 constitutes the base of the triangle.

34 designates a protective cover for the entire locking mechanism.

From all of the foregoing it will be appreciated that my invention provides a construction in which it becomes unnecessary to rely upon stationary structures, such as arm rests etc., for supporting the recline and locking mechanism, this mechanism in my construction being carried by the back frame.

It will be appreciated also that, because the back frame carries the recline and locking mechanism, removal of the back frame and recline and locking mechanism from the bottom frame, as a unit, is facilitated.

It is further apparent that, by mounting the recline and locking mechanism to the back frame, I provide for the maximum in shin clearance and in luggage space beneath the seat.

It will be appreciated still further that, by mounting all of the recline and locking mechanism upon the seat back, not only is removal and replacement of the back unit facilitated, as above noted, but the construction required to permit the seat back to be tilted forward over the seat bottom is reduced to a very simple form.

It is to be understood that changes may be made in the details of construction and arrangement of parts within the purview of my invention.

What I claim is:

1. A seat comprising, in combination, a bottom frame; a back frame pivoted to the said bottom frame; and recline and locking mechanism for the seat comprising a first link and a second link pivoted to each other at one end, the opposite end of the first link being pivoted to the back frame, said first link being lineally adjustable between the ends thereof, and the opposite end of the second link being pivoted to the bottom frame at the pivotal connection between the back and bottom frames.

2. A seat comprising, in combination, a bottom frame; a back frame pivoted to the said bottom frame; recline mechanism for the seat carried by the back frame; and a quick-release spring catch carried by the bottom frame and cooperating with the said recline mechanism, normally to maintain the back frame elevated or extended with respect to the bottom frame, said spring catch being releasable by a forward force applied to the rear face of the back frame to permit the back frame and recline mechanism to be folded forward upon the bottom frame.

3. A seat comprising, in combination, a bottom frame; a back frame pivoted to the bottom frame; recline mechanism pivotally carried by the back frame, said recline mechanism comprising a spring-loaded, extensible link having its upper end pivoted to the back frame, and a second link having its outer end pivoted to the lower end of the first-mentioned link and its inner end pivoted to the pivotal connection between the back frame and bottom frame; and a quick-release spring clip normally engaged by the lower end of the recline mechanism to maintain the back frame and recline mechanism against forward folding movement upon the bottom frame.

4. A seat comprising, in combination, a bottom frame; a back frame pivoted thereto; recline mechanism carried by the back frame; a quick-release spring clip carried by the bottom frame and normally engaging the said recline mechanism, to prevent forward collapse of the back frame and recline mechanism; and locking mechanism incorporated in the recline mechanism and operable by an occupant of the seat for locking the back frame at various angles of recline.

5. A seat comprising, in combination, a bottom frame; a back frame pivoted to the said bottom frame; and recline and locking mechanism for the seat comprising two links pivoted at one end to each other, the opposite end of one link being pivoted to the bottom frame, and the opposite end of the other link being pivoted to the back frame, the last-mentioned link comprising two telescoping tubes and a compression spring between the tubes to provide an extensible link.

6. A seat comprising, in combination, a bottom frame; a back frame pivoted to the said bottom frame; and recline and locking mechanism for the seat comprising two links pivoted at one end to each other and at their opposite ends to the back frame and bottom frame, respectively; the link which is pivoted to the back frame comprising two telescoping tubes having a compression spring between them to provide an extensible link, the walls of said tubes being provided with apertures adapted to be brought into register with each other when the back frame is moved to various angles of recline; and a spring-loaded pin supported by one of said tubes and controlled by an occupant of the seat for insertion into registered apertures to lock the recline mechanism at various angles of recline.

7. A seat comprising, in combination, a bottom frame; a back frame pivoted to said bottom frame; and recline and locking mechanism for the seat comprising a first link and a second link pivoted to each other at one end, the opposite end of the first link being pivoted to the back frame, said first link being lineally adjustable between the ends thereof, and the opposite end of the second link being pivoted to the bottom frame at the pivotal connection between the back and bottom frames, whereby detachment of the pivotal connection between the back frame and bottom frame effects removal of the back frame and recline mechanism as a unit.

8. A seat comprising, in combination, a bottom frame; a back frame pivoted thereto; substantially vertically disposed recline mechanism pivoted at its upper end to the rear side of the back frame, the lower end of said recline mechanism having a pivotal connection to the said bottom frame at a point to the rear of the said pivotal connection between the back frame and bottom frame; and means for effecting lineal, manual adjustment of the recline mechanism intermediate its ends.

References Cited in the file of this patent

UNITED STATES PATENTS

| | | |
|---|---|---|
| 712,651 | Collier | Nov. 4, 1902 |
| 1,203,572 | Betts | Nov. 7, 1916 |
| 1,663,864 | Russell | Mar. 27, 1928 |
| 2,074,621 | Salomon | Mar. 23, 1937 |
| 2,738,001 | Drabert | Mar. 13, 1956 |

FOREIGN PATENTS

| | | |
|---|---|---|
| 398,737 | Great Britain | Sept. 21, 1933 |
| 725,501 | France | Feb. 15, 1932 |